INTERCEPTING TRUNK CIRCUIT

Filed July 26, 1952 3 Sheets-Sheet 1

INVENTOR.
WILLIAM W. PHARIS
BY Francis E. Blake
ATTORNEY

INTERCEPTING TRUNK CIRCUIT

Filed July 26, 1952 3 Sheets-Sheet 2

INVENTOR.
WILLIAM W. PHARIS
BY
*Francis E. Blake*
ATTORNEY

Aug. 9, 1955 W. W. PHARIS 2,715,160

INTERCEPTING TRUNK CIRCUIT

Filed July 26, 1952 3 Sheets-Sheet 3

INVENTOR.
WILLIAM W. PHARIS
BY Francis E. Blake
ATTORNEY

United States Patent Office 2,715,160
Patented Aug. 9, 1955

2,715,160

INTERCEPTING TRUNK CIRCUIT

William W. Pharis, Rochester, N. Y., assignor to Stromberg-Carlson Company, a corporation of New York Application July 26, 1952, Serial No. 301,011

9 Claims. (Cl. 179—27)

Figure 1:
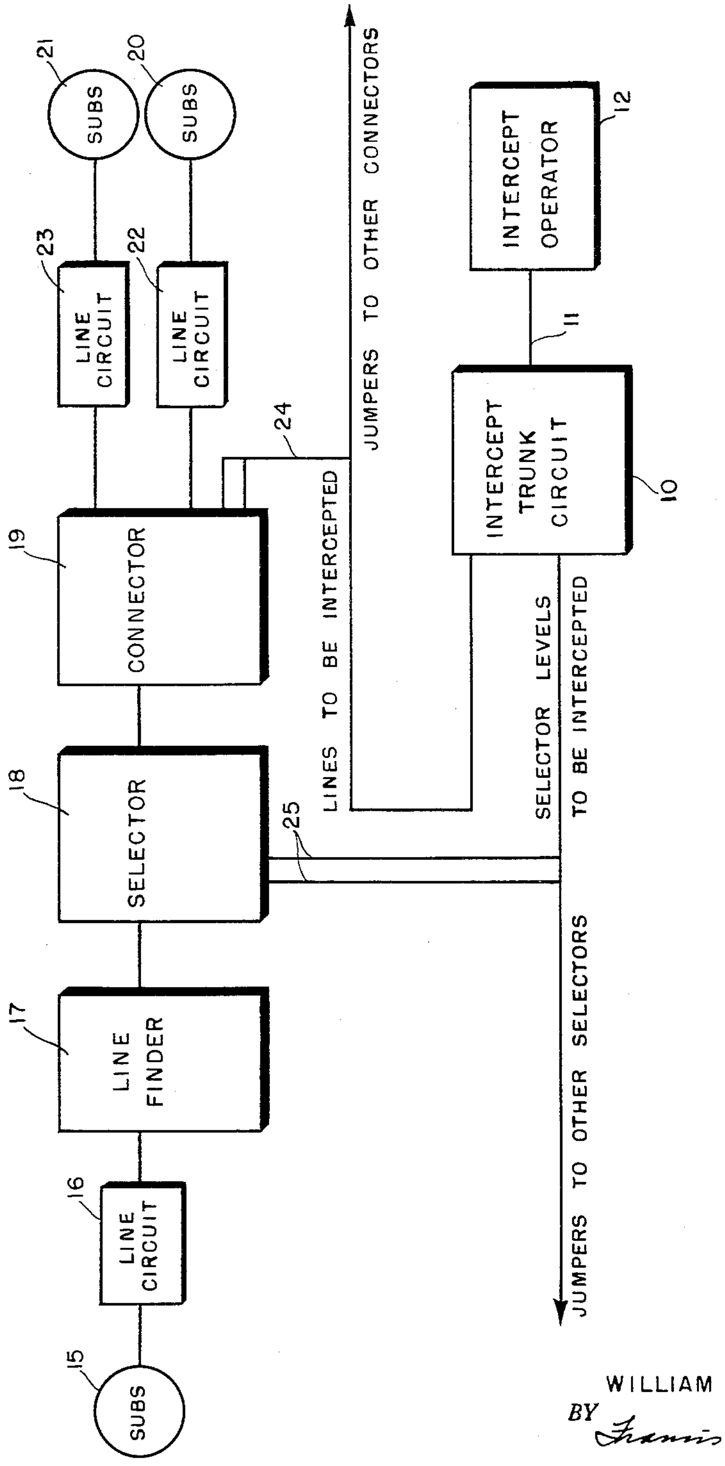

The present invention relates to telephone systems and more particularly to intercepting trunk circuits for use in automatic telephone systems.

Intercepting trunk circuits for use in automatic telephone systems have previously been actuated by ringing current supplied by the connector circuit or by other ringing current circuits when intercepting calls from a selector circuit. Such intercepting trunk circuits have therefore required individual line circuit equipment for each group of intercepted lines to be connected by the intercept circuit to a common answering trunk.

It is an object of my invention to provide an improved intercepting trunk circuit for use with automatic telephone systems that may be connected directly to the selector and connector terminals to be intercepted and therefore does not require the use of line circuit equipment.

Another object of my invention is to provide an intercept trunk circuit for use with automatic telephone systems of the type having selector and connector switches and circuits, which intercept circuit may be automatically actuated upon the selective direction of connector or selector circuits to thereby establish connection between an intercept operator trunk line and the line terminals of a connector or the terminals of selector levels to be intercepted and without requiring ringing current to obtain the desired operation of the intercept circuit.

Yet another object of the invention is to provide an intercept trunk circuit for use with automatic telephone systems of the type having selector and connector circuits, the intercept circuit being common to both selector and connector circuits and arranged to be directly connected to both selector and connector line terminals to be intercepted.

It is a further object of the invention to provide an intercept trunk circuit having busy guarding circuit arrangements for both selector and connector circuits such that the seizure of the intercept circuit by a connector or selector circuit will prevent all other connector or selector circuits from seizing the intercept circuit.

A feature of the invention is the provision of an intercept trunk circuit having conductors for connection by jumpers to selector and connector line terminals to be intercepted and including relay means and signal means activated in response to the direction of the connector circuit under control of a calling line to connect with connector line terminals to be intercepted for establishing an intercept circuit busy condition and signaling an intercept operator and is further provided with means responsive to the answering connection of the intercept operator to deactivate the signal means, operate the ring trip relay of the connector circuit, and establish a talking connection between the intercept operator and the calling party. In this regard, another feature of the invention is the provision of relay means controlled by a ring key of the intercept operator to transmit a supervisory signal back through the connector circuit in the event the calling line may be that of a toll line operator.

Yet another feature of the invention in an intercept trunk circuit connected to both selector and connector circuits of an automatic telephone system as set forth in the preceding features of the invention, is the provision of relay means operated in response to the direction of a selector circuit to the line terminals of a selector level to be intercepted to thereby activate the intercept operator signal means, connect a talking path between the calling line and the trunk line of the intercept operator, and establish an intercept trunk circuit busy condition, the signal means being deactivated upon the answering connection by the intercept operator. In this regard, relay means may also be provided to be operated by the intercept operator's ring key for establishing a supervisory signal through the selector circuit when the calling line may be that of a toll line operator or the like.

Figure 2:
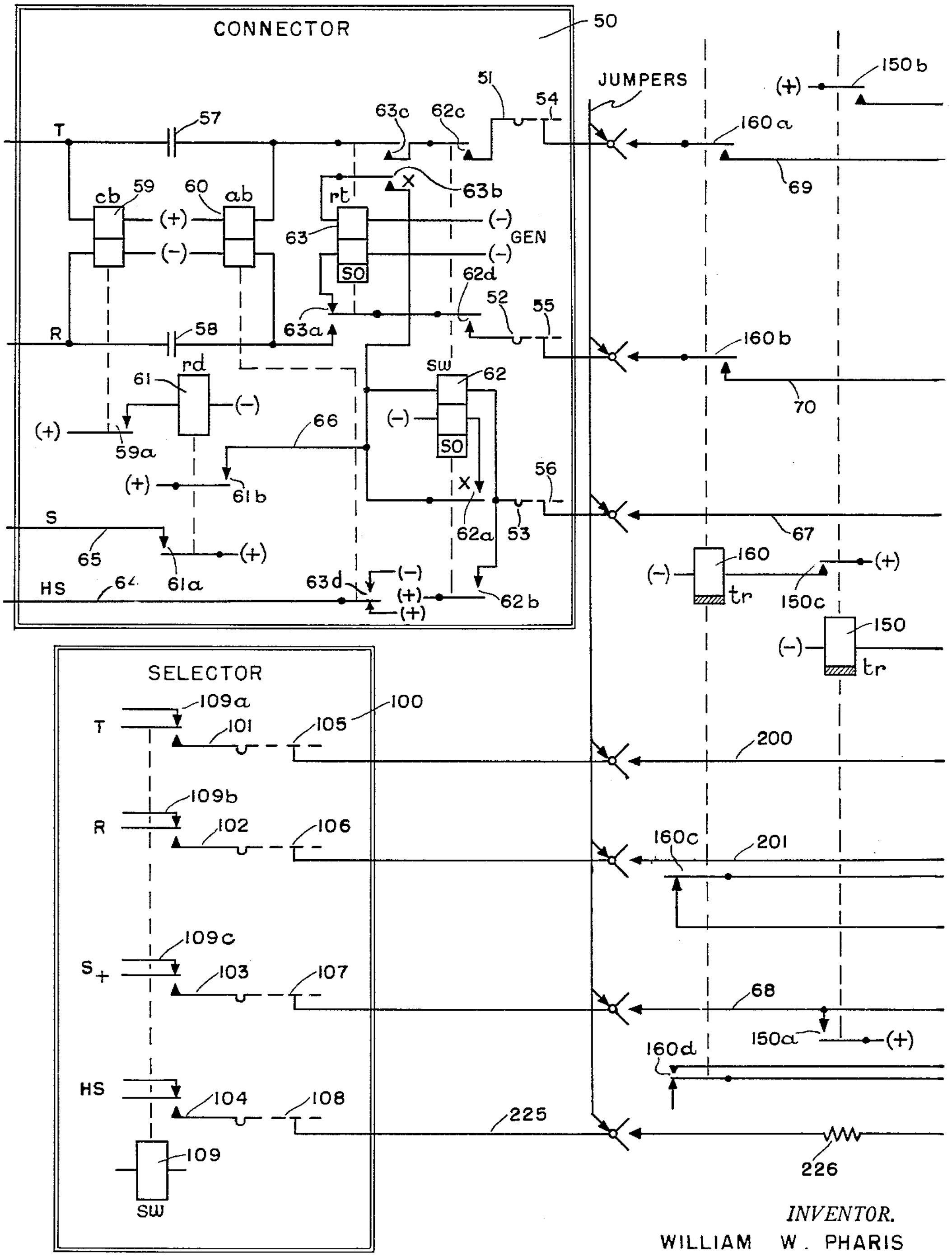
Figure 3:
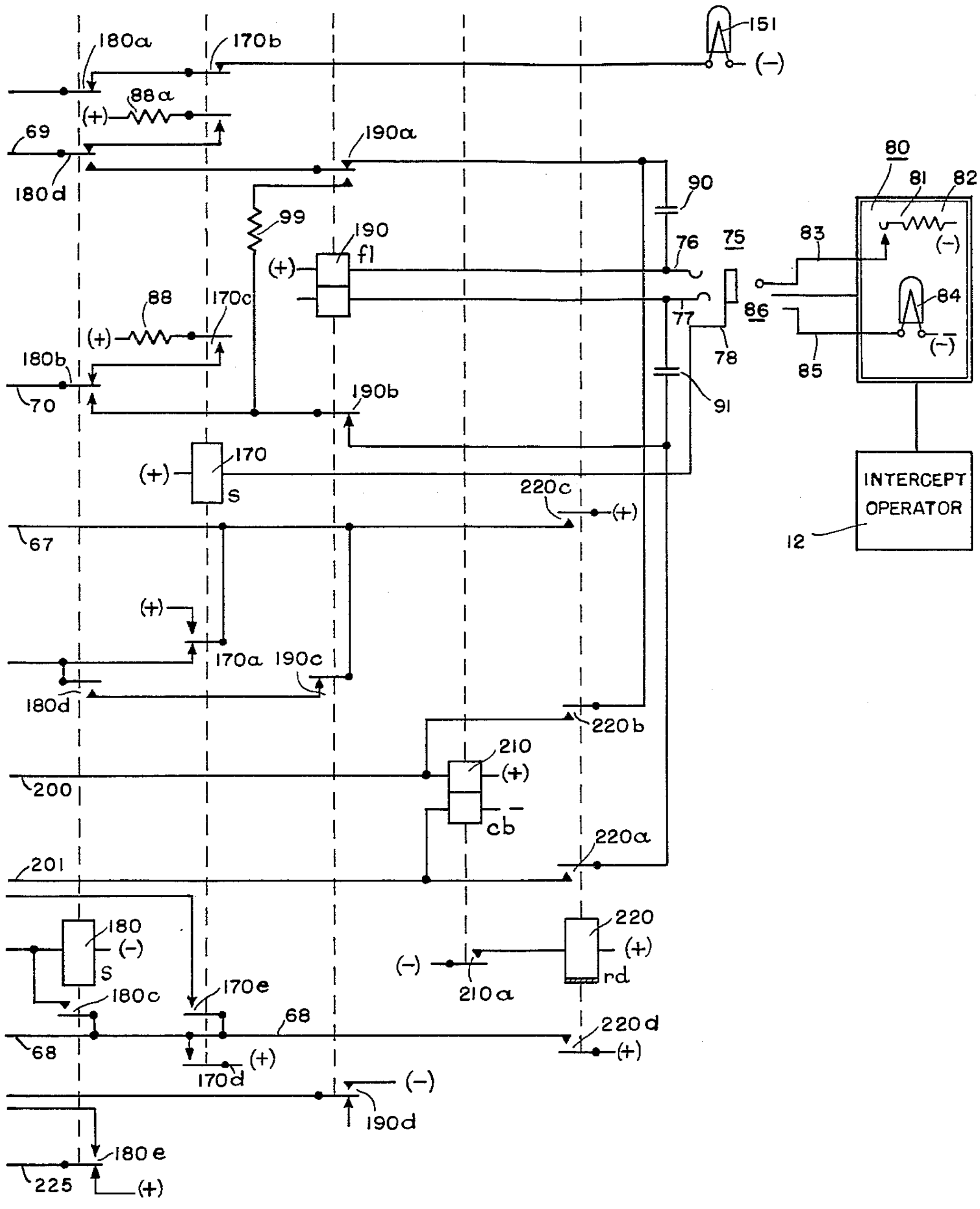

Further objects, features and the attending advantages of the invention will be apparent with reference to the following specification and drawings in which Figure 1 is a simplified block diagram of an automatic telephone system of the type having selector and connector circuits with the intercept trunk circuit of this invention incorporated therewith; and Figs. 2 and 3, with Fig. 3 placed to the right of Fig. 2, comprise a wiring diagram of the intercept trunk circuit of the invention together with certain of the elements of the automatic telephone system selector and connector circuits and switches which are shown as required for an understanding of the description and operation of the invention.

Referring to Fig. 1 of the drawings the intercept trunk circuit of the invention is shown in block outline at 10 and is connected to an intercept operator trunk line 11 and the intercept operator position shown at 12. An automatic telephone system with which the intercept trunk circuit of this invention may be used, is also shown in simplified form and, for example, may include a calling subscriber 15 and line circuit 16. The line circuit 16 is connected to a conventional line finder and selector circuit and switch combination, 17 and 18, which in turn is connected to the connector circuit and switch shown at 19. A plurality of called subscriber lines such as 20 and 21 and their associated line circuits 22 and 23, may be connected to the terminals of the connector circuit 19. In addition, the connector circuit 19 may also have connector terminals for lines which are to be intercepted for the usual reasons and these terminals are connected by jumper wires, generally shown at 24, to the intercept trunk circuit 10. In the simplified block diagram of Fig. 1 the line connections between the various elements of the various circuits of the automatic telephone system are shown by a single line connection, but it should be understood that such single line connection is generally illustrative of the conventional multiple leads for each line including tip, ring and sleeve, and in some instances, fourth supervisory control leads. The selector circuit and switch generally shown at 18 also may be provided with a number of unused selector levels which are therefore to be intercepted and are connected by jumper lines generally shown at 25 to the intercept trunk circuit 10.

Since the intercept trunk circuit 10 as provided by the present invention may be connected in parallel by jumpers to any number of connector line terminals to be intercepted, provision is made in the intercept trunk circuit to prevent the trunk circuit from being seized by more than one circuit to be intercepted at any one time. It should also be noted that the intercept trunk circuit 10 is connected directly to the terminals to be intercepted of the selector 18 or connector 19 and that no individual line circuits are used. Furthermore, as will be pointed out in more detail hereinafter, the intercept trunk circuit 10 is automatically operated upon the directive operation of either selector 18 or connector 19 to establish a connection between a calling line and terminals to be intercepted and does not require ringing current responsive relays to effect the intercepting operations.

Referring now to Figs. 2 and 3 of the drawings, a detailed description of the intercept trunk circuit of the invention and its operation by either a connector or selector circuit and switch will be made. The elements of the connector circuit and switch which are required for a detailed description and understanding of the invention are shown in the block outline 50 while the corresponding necessary elements of the selector circuit and switch are shown within the block outline 100. Both the connector circuit and switch 50 and selector circuit and switch 100 are conventional and any components known in the art may be used for the designated functions and purposes. For example, the connector switch may include switch brushes 51, 52 and 53, adapted to be directively operated under control of a calling party to engage selected ones of a plurality of switch contact terminals such as 54, 55 and 56 connecting with tip, ring and sleeve leads. The connector circuit 50 further includes a transmission bridge consisting of capacitors 57 and 58 in series with the tip and ring leads, respectively, together with a calling bridge relay 59 and answer bridge relay 60 as is conventional. The release delay relay 61, switch through relay 62 and ring trip relay 63 are also shown in their required connections for use with the connector circuit and the intercept trunk circuit.

The selector circuit and switch 100 preferably includes directively operated switch brushes 101—104 for cooperation with a plurality of switch contacts such as shown at 105—108 corresponding to the tip ring, sleeve and fourth supervisory control leads, respectively. The selector circuit and switch 100 also includes, in addition to other relays (not drawn), a switch through relay 109 which is normally effective upon the directive operation of the selector switch and circuit to an idle intercept trunk line circuit or connector circuit to switch through the lines of the preceding circuits and to establish a busy condition for the selector circuit and switch and the circuits seized thereby.

There follows detailed descriptions of calls extended from a calling party or a toll operator to the intercepting trunk circuit of the invention when received from either connector or selector circuits and switches together with the subsequent answering procedures initiated by the intercept operator. It is believed that the various detailed circuit descriptions may be most readily understood when described in connection with the explanations of their operation.

*Intercepted call from a local party through connector switch 50*

Upon receiving a call from a local party through preceding circuits to the connector circuit and switch 50, the calling bridge relay 59 will be energized to energize the release delay relay 61 through operated contacts 59*a*. The operation of the release delay relay 61 places busy signal ground on the back sleeve lead 65 through operated contacts 61*a* to thereby identify this connector as busy. The operation of release delay relay 61 also places ground through operated contacts 61*b* on the lead 66 which is effective when the connector is directively operated to terminals to be intercepted to thereby energize the switch through relay 62 in circuit with the brush 53, contacts 56, line 67, normally closed contacts 170*a* and trip relay 150 to battery. Trip relay 150 and switch through relay 62 therefore operate together in series and the switch through relay 62 establishes its holding circuit through preliminary make operated contacts 62*a* and also places busy signal ground on the intercept trunk circuit sleeve brush 53 and lead 67 through operated contacts 62*b*. Since the sleeve lead 67 is jumpered to all other connector and selector circuits connected to the intercept trunk circuit of the invention, the connection of ground through operated contacts 62*b* to sleeve brush 53 and lead 67 seizes the intercept trunk circuit by the connector 50 and prevents its seizure by any other connectors or selectors. This will be apparent when it is considered that the switch through relay 62 of other connector circuits cannot be preliminarily operated in view of the ground on the sleeve brush 53 and the sleeve lead 67. Also, in this regard, the operation of trip relay 150 places ground through operated contacts 150*a* on the sleeve lead 68 connected to the sleeve terminals of the idle selector levels of all of the selectors such as selector 100 and thus establishes the busy condition of the intercept trunk circuit for all selector circuit and switch operation.

The operation of trip relay 150 also energizes the intercept operator's signal means such as the lamp 151 from battery through normally closed contacts 170*b*, 180*a* and operated contacts 150*b* to ground. In addition, the operation of trip relay 150 energizes trip relay 160 through operated contacts 150*c* from ground through to battery. Both trip relays 150 and 160 are slow-release relays and their slow-release characteristics will be later discussed in detail in connection with various specific operations of the intercept trunk circuit.

The operation of the trip relay 160 establishes a connection between the tip and ring terminals 54 and 55 of the connector through operated contacts 160*a* and 160*b* to the tip and ring conductors 69 and 70 of the intercept trunk circuit. The previously described operation of the switch through relay 62 of the connector circuit connected the switch brush 51 through operated contacts 62*c* and the switch brush 52 through operated contacts 62*d* and normally closed contact 63*a* with ringing current supplied from the ringing current generator through coils of the ring trip relay 63. It should be mentioned, however, that the connection of ringing current to the ring conductor 70 of the intercept trunk circuit is not required in order to obtain the desired automatic operation of the intercept trunk circuit as will be more apparent hereinfter.

The previously described energization of the intercept operator's signal lamp 151 notifies the intercept operator that a call is to be intercepted on the intercept operator's trunk line. The intercept operator trunk line terminates at the jack generally indicated at 75 having a tip contact 76, ring contact 77 and sleeve terminal 78. The intercept operator 12 is provided with a conventional cord circuit generally indicated at 80 and including a ring key 81 which, when operated, connects battery in series with resistor 82 to the tip lead 83. The cord circuit also includes a supervisory lamp or resistor 84 connected in series between battery and the sleeve terminal 85 of the plug cord circuit generally shown at 86. The intercept operator, upon noting the energization of the signal lamp 151, plugs the cord circuit into the jack 75 and sleeve relay 170 is thereby energized from the cord circuit battery, the resistance of the supervisory lamp 84, the sleeve terminal 78 of the jack 75 through to ground. The operation of relay 170 connects busy signal ground to sleeve leads 67 and 68 through operated contacts 170*a* and 170*d*, respectively, and also opens contacts 170*b* to deenergize the intercept operator's signal lamp 151. The operation of contacts 170*a* also is effective to open the circuit to and deenergize the slow-release trip relay 150 which upon its subsequent complete release, deenergizes the slow-release trip relay 160. Relays 150 and 160 should have slow-release characteristics in order to prevent the release of the trip relay 160 before the slow operating connector ring trip relay 63 can be operated. The ring trip relay 63 is energized upon the operation of sleeve relay 170 by the connection of ground through resistor 88, operated contacts 170*c*, normally closed contacts 180*b*, line 70, operated contacts 160*b* and 62*d* and normal contacts 63*a* to ringing generator and battery. The flow of D. C. current thus provided through the coil of the ring trip relay 63 closes the preliminary make contacts 63*b* to establish a holding circuit for the ring trip relay 63 from ground, operated contacts 61*b*, line 66, operated contacts 63*b*, and relay 63 to battery. The operation of ring trip relay 63, through operated contacts 63*a* and 63*c*, also connects the answer bridge relay 60 and capacitors 57 and 58 to the connector switch brushes 51 and 52. During the aforementioned operation of sleeve relay 170 and ring trip relay 63, the trip relays 150 and 160 are releasing. The operated contacts 170*a* maintain busy signal ground on lead 67 and operated contacts 170*d* maintain busy ground signal on sleeve lead 68. When trip relay 160 is fully released, contacts 160*a* and 160*b* are restored to their normally open position. It should be mentioned that the ring trip resistor 88*a* is provided since, in some connector circuits, the preliminarily operated coil of the ring trip relay is connected to the connector tip lead instead of to the connector ring lead as has been shown in Fig. 2. The complete release of trip relay 160 also establishes a circuit through its normally closed contacts 160*c* to energize sleeve relay 180 from battery through operated contacts 170*e* to the ground on sleeve lead 68. Sleeve relay 180 immediately locks up through its operated contacts 180*c*, and contacts 180*d* are operated to reenergize the trip relay 150 from battery through normally closed contacts 190*c* to the ground on the sleeve lead 67. The operation of trip relay 150 again energizes trip relay 160 to close contacts 160*a* and 160*b* to establish a talking connection from the connector 50 through tip and ring conductors 69 and 70 of the intercept trunk circuit, operated contacts 180*b* and 180*d*, normal contacts 190*a* and 190*b* and capacitors 90 and 91 to the intercept operator's trunk line jack 75.

After the intercept operator has informed the calling party that the line has been intercepted, she may remove her cord circuit plug 86 from the intercept trunk line jack 75 which releases sleeve relay 170 and causes all other operated relays in the intercept trunk circuit to be released assuming the calling party to have disconnected. In such a manner the intercept trunk circuit is restored to normal and the switch through relay 62 of the connector is released causing the connector to return to normal. Also, the busy signal ground is removed from the sleeve conductors 67 and 68 thus making the intercept trunk circuit again available for seizure by any selector or connector circuit connected thereto as desired.

Alternatively, the calling party may hang up before release of the intercept trunk circuit by the intercept operator in which case the release delay relay 61 and the ring trip relay 63 are released causing the switch through relay 62 to release and the connector switch to return to normal. The release of the connector release delay relay 61 removes busy signal ground from the back sleeve lead 65 to release all preceding circuits of the automatic telephone system. The operated relays of the intercept trunk circuit remain energized, however, so long as the intercept operator's cord circuit is connected to jack 75 and sleeve relay 170 is thereby energized. Thus the intercept trunk circuit remains busy to all other connectors and selectors until the intercept operator has unplugged the cord circuit. Under yet another condition of operation, should the calling party through the connector 50 abandon the call before the intercept operator has connected her cord circuit with the intercept trunk line jack 75, the release of the connector relays 61, 62 and 63 also causes trip relays 150 and 160 of the intercept circuit to release thus deenergizing the intercept operator's signal lamp 151 and breaking the tip and ring circuits at normally opened contacts 160*a* and 160*b*.

*Intercepted call from toll operator through connector switch 50*

In the preceding paragraphs the invention has been described in connection with its operation through the connector 50 by a local calling party. When the calling party is a toll operator or the like and it is assumed that the connector circuit 50 has been directively operated to move the connector switch brushes 51—53 into contact with line terminals 54—56 to be intercepted, the connector circuit relays 61—63 and the intercept trunk circuit relays 150, 160, 170 and 180 all operate as previously described. However, the intercept operator upon receiving the connection through to the incoming tip and ring terminals of the connector circuit 50 may get no immediate response in the event that the call originates with a toll operator. In order to provide a supervisory signal by means of which the toll operator may be prompted into conversation with the intercept operator the following described additional relays and circuits are provided.

The intercept operator's cord circuit 80 has already been described as having a ring key 80 which, when operated, connects battery through the resistor 82 to the tip lead 83 and when the plug 86 is received in the intercept trunk jack 75 a D. C. circuit is thereby established through the flash relay 190 to energize the same. The energization of flash relay 190 operates contacts 190*a* and 190*b* and establishes a circuit for connecting the low-resistance resistor 99 across the tip and ring leads 69 and 70 back to the connector circuit. The connection of the resistor 99 across lines 69 and 70 establishes a D. C. series circuit through the answer bridge relay 60 which is thus operated in the conventional manner to operate contacts 63*d* and to thereby provide a supervisory signal back through the hunt sleeve lead 64 to the preceding automatic telephone circuits to the toll operator. The energization of the flash relay 190 to connect resistor 99 in a manner to operate the answer bridge relay as described, also opens the switch contacts 190*c* to break the holding circuit for the slow-release trip relay 150 which, after it completely releases, deenergizes the slow-release relay 160. After the complete release of the trip relay 160 the contacts 160*a* and 160*b* are restored to their normally open condition to thereby limit the period of time during which the resistor 99 is effective to operate the answer bridge relay 60. Thus the supervisory signal obtained by the operation of the intercept operator's ring key 81 is limited in duration to the total time interval necessary for slow-release trip relays 150 and 160 to release in sequence. When the intercept operator releases the ring key 81 the flash relay 190 is again deenergized to reenergize trip relays 150 and 160 and reestablish the talking connection for the intercept operator.

*Intercept call from unused level of selector 100*

The selector circuit and switch 100 being described is of the type having four leads per line including tip, ring, sleeve and fourth supervisory control leads. There are a number of switch operating magnets and relays in the selector circuit which may be conventional and have not been shown. It is assumed that the selector switch has been directively operated to bring the switch brushes 101—104 into engagement with switch terminal contacts 105—108 for an unused level to be intercepted of the selector. It is also assumed that the intercept trunk circuit of the invention is at the moment idle and there is no guarding ground on either sleeve leads 67 or 68. The selector circuit and switch 100 therefore operates in a conventional manner to energize the switch through relay 109 to connect incoming tip and ring terminals with the intercept trunk circuit tip and ring leads 200 and 201 through operated contacts 109*a* and 109*b*. Operated contacts 109*c* connect busy guarding ground through switch contact 107 to the intercept trunk circuit selector sleeve jumper lead 68 thus establishing this circuit as busy for all other selectors. The operation of contacts **109*a* and 109*b* completes a D. C. path from the preceding line circuits through calling bridge relay 210 which is thereby operated to close contacts 210*a* and energize the release delay relay 220 in the obvious circuit from battery to ground. The release delay relay 220 is thereby operated to close contacts 220*a* and 220*b* and establish a talking circuit from the intercept trunk circuit tip and ring lines 200 and 201 through capacitors 90 and 91 to the intercept operator's trunk line jack 75. The operation of the release delay relay 220 also closes contacts 220*c* to connect ground to the intercept trunk circuit connector jumper sleeve lead 67 and cause the sequential energization of trip relays 150 and 160. The operation of trip relay 150 energizes the intercept operator's signal lamp 151 as previously described. The operation of release delay relay 220 also closes switch contacts 220*d* to provide an additional ground upon sleeve lead 68 which is used in connection with the operation of the circuit to provide a supervisory signal back through the selector as will be again referred to in detail. The intercept operator upon connecting the line circuit plug with the line jack 75 energizes the sleeve relay 170 to open switch contacts 170*b* and extinguish the signal lamp 151**.

If the calling party through the selector 100 disconnects first, the intercept trunk circuit of the invention is uneffected except for the deenergization of relays 210 and 220. However, with the calling party disconnected, the intercept operator disconnects by removing the plug 86 from the jack 75, relays 170, 150 and 160 are deenergized, and guarding ground is removed from the sleeve lead 68. The deenergization of the release delay relay 220 also opens contacts **220*c* to remove the guarding ground connection to the sleeve lead 67. Thus, in such a manner, the intercept trunk circuit is returned to normal. It should be noted that the intercept operator's lamp 151 remains deenergized during the release sequence of the various relays since during such time interval at least one of the various switch contacts 150*b*, 170*b* or 180*a*** will be opened.

*Intercepted call from toll operator through unused selector level*

The operation of the intercept trunk circuit when intercepting a call from a toll operator through the selector circuit and switch 100 is essentially as described above. However, provision is made for connecting a supervisory signal to the fourth supervisory control lead 225 connecting between the intercept trunk circuit and the selector circuit and switch 100. It is assumed that a talking connection has been established from the toll operator and the calling line through the selector 100 and also that the intercept operator has plugged into the intercept trunk line at the jack 75. It is also assumed that the toll operator has not answered the intercept operator and a supervisory signal is therefore required. The intercept operator upon closing the ring key 81 energizes the flash relay 190 in the manner previously described in connection with the interception of a toll operator's call from the connector circuit 50. The operation of the flash relay 190 closes contacts **190*d* to connect a supervisory signal from battery through to operated contacts 160*d*, 180*e*, and current limiting resistor 226 to the fourth supervisory control lead 225 and switch contact 108 of the selector circuit 100 to the preceding automatic telephone circuits (not shown). As has been previously described, the energization of the flash relay 190 also causes the subsequent release of the slow-release trip relays 150 and 160 which, after trip relay 160 has fully released, opens contacts 160*d* to thereby limit the duration of the supervisory signal for the fourth supervisory control lead 225 notwithstanding the period of time during which the intercept operator's ring key 81 is closed. It should be noted that ground through normal contacts 180*e* is normally connected to the supervisory control lead 225 until the sleeve relay 180 has been operated. The release of the ring key 81 by the intercept operator again releases the flash relay 190 and reenergizes the trip relays 150 and 160** to enable the circuits to be reconditioned for another supervisory signal by the intercept operator, or to enable the intercept operator to converse, as desired.

It is believed that the invention should now be readily understood. As has been previously mentioned, the intercept trunk circuit of this invention is not to be limited to its use with any specific form of connector or selector switches and circuits and that it may be used with any type of automatic telephone system in which the lines to be intercepted are provided with at least tip, ring, and sleeve leads. The invention has been specifically described in connection with its use with a selector circuit of the type having a fourth supervisory control lead when toll operator supervision is required. It should be understood, however, that the invention may be used to advantage with selector circuits not employing a fourth supervisory control lead when such form of toll operator supervision is not desired.

Various modifications may be made within the spirit of the invention and the scope of the appended claims.

What I claim is:

1. In an automatic telephone system of the type having selector circuits and connector circuits, with each connector circuit having a transmission bridge and a ring tripping relay, each of said connector and selector circuits having tip and ring leads and a plurality of tip and ring terminals, an intercept trunk circuit directly connected to selected ones of the tip and ring terminals of both selector circuits and connector circuits to be intercepted including in combination, an intercept operator trunk line, intercept operator signal means, an intercept operator cord circuit, first means responsive to the positioning of the connector at the selected connector terminals to be intercepted and operative to activate said signal means, second means responsive to positioning of the selector at selected terminals to be intercepted in a selector level and operative to activate said signal means and connect the selected terminals to said intercept operator trunk line, and third means responsive to the connection of said intercept operator's cord circuit with said trunk line after the operation of said first means to thereby deactivate said signal means and energize the ring tripping relay of the connector circuit and thereafter to connect the tip and ring leads of the connector through the connector tip and ring terminals and intercept trunk circuit to the intercept operator trunk line, said third means being also responsive to the connection of said intercept operator's cord circuit with said trunk line after the operation of said second means to thereby deactivate said signal means.

2. In an automatic telephone system of the type having selector circuits and connector circuits, with each connector circuit having a transmission bridge and a ring tripping relay, each of said connector and selector circuits having tip, ring and sleeve leads and a plurality of tip, ring and sleeve terminals, the intercept trunk circuit directly connected to selected ones of the tip, ring and sleeve terminals of both selector circuits and connector circuits to be intercepted including in combination, an intercept operator trunk line, intercept operator signal means, an intercept operator cord circuit, first means responsive to the positioning of the connector at the selected connector terminals to be intercepted and operative to activate said signal means, second means responsive to the positioning of the selector at selected terminals to be intercepted in a selector level and operative to activate said signal means and connect the selected terminals to said intercept operator trunk line and to also connect a busy signal to the selected ones of the sleeve terminals of the connector circuit, and third means responsive to the connection of said intercept operator's cord circuit with said trunk line to deactivate said signal means, said first means when operated being effective to connect a busy signal to the selected ones of the sleeve terminals of the selector circuit.

3. In an automatic telephone system of the type having selector circuits and connector circuits, with connector circuit having a transmission bridge and a ring tripping relay, each of said connector and selector circuits having tip, ring and sleeve leads and a plurality of tip, ring and sleeve terminals, each selector circuit further having a fourth supervisory lead and a plurality of fourth supervisory lead terminals, the intercept trunk circuit directly connected to selected ones of the connector tip, ring and sleeve terminals to be intercepted and to selected ones of the selector tip, ring, sleeve and supervisory terminals to be intercepted including in combination, an intercept operator trunk line, intercept operator signal means, an intercept operator cord circuit, first means responsive to the positioning of the connector at selected connector terminals to be intercepted and operative to activate said signal means, second means responsive to positioniong of the selector at selected terminals to be intercepted in a selected lever and operative to activate said signal means and connect the selected terminals to said intercept operator trunk line and to also connect a busy signal to the selected ones of the sleeve terminals of the connector circuit, third means responsive to the connection of said intercept operator's cord circuit with said trunk line after the operation of said first means to thereby deactivate said signal means and energize the ring tripping relay of the connector circuit and thereafter to connect the tip and ring leads of the connector through the connector tip and ring terminals and intercept trunk line circuit to the intercept operator trunk line, said third means being also responsive to the connection of said intercept operator's cord circuit with said trunk line after the operation of said second means to thereby deactivate said signal means, said first means when operated being effective to connect a busy signal to the selected ones of the sleeve terminals of the selector circuit, said intercept operator cord circuit having a ring key, and fourth means responsive to the operation of said ring key for effecting the operation of said transmission bridge of the connector circuit to transmit a supervisory signal back through said connector circuit when said intercept operator trunk line is connected therewith, said fourth means also being effective when operated by the ring key during connection of the intercept operator trunk line with said selected ones of the selector circuit terminals to transmit a supervisory signal back through said fourth supervisory lead of said selector circuit.

4. In an automatic telephone system of the type having connector circuits, with each connector circuit having a transmission bridge and a ring tripping relay, each of said connector circuits having tip and ring leads and a plurality of tip and ring terminals, an intercept trunk circuit directly connected to selected ones of the tip and ring terminals to be intercepted including in combination, an intercept operator trunk line, intercept operator signal means, an intercept operator cord circuit, first means responsive to the positioning of one of said connectors at selected connector terminals to be intercepted for activating said signal means, second means responsive to the connection of said intercept operator's cord circuit with said trunk line to deactivate said signal means and energize the ring tripping relay of said one connector circuit and thereafter to connect the tip and ring leads of said one connector circuit through the selected connector tip and ring terminals to the intercept operator trunk line, said intercept operator cord circuit having a ring key, and third means responsive to the operation of said ring key for effecting the operation of the transmission bridge of said one connector circuit to transmit a supervisory signal back through said one connector circuit when said intercept operator trunk line is connected therewith.

5. In an automatic telephone system of the type having connector circuits, with each connector circuit having a transmission bridge and a ring tripping relay, each of said connector circuits having tip, ring and sleeve leads and a plurality of tip, ring and sleeve terminals, an intercept trunk circuit directly connected to selected ones of the tip, ring and sleeve terminals to be intercepted including in combination, an intercept operator trunk line, intercept operator signal means, an intercept operator cord circuit, first means responsive to the positioning of one of said connectors at selected connector terminals to be intercepted for activating said signal means and for connecting a busy signal to the selected connector sleeve terminals to be intercepted, second means responsive to the connection of said intercept operator's cord circuit with said trunk line to deactivate said signal means and energize the ring tripping relay of said one connector circuit and thereafter to connect the tip and ring leads of said one connector circuit through the selected connector tip and ring terminals to the intercept operator trunk line, said intercept operator cord circuit having a ring key, and third means responsive to the operation of said ring key for effecting the operation of the transmission bridge of said one connector circuit to transmit a supervisory signal back through said one connector circuit when said intercept operator trunk line is connected therewith.

6. In an automatic telephone system of the type having selector circuits, with each selector circuit having a switch through relay and including a plurality of tip, ring and supervisory terminals, an intercept trunk circuit directly connected to selected ones of the tip, ring and supervisory terminals to be intercepted including in combination, an intercept operator trunk line, intercept operator signal means, an intercept operator cord circuit, first means responsive to the positioning of the selector at selected selector terminals to be intercepted and the operation of said switch through relay for activating said signal means and connecting the selected tip and ring terminals of the selector to said intercept operator trunk line, second means responsive to the connection of said intercept operator's cord circuit with said trunk line to deactivate said signal means, said intercept operator cord circuit having a ring key, and third means responsive to the operation of said ring key during connection of the intercept operator trunk line with said selector circuit terminals to transmit a supervisory signal back through said selected supervisory terminal of said selector circuit.

7. In an automatic telephone system of the type having selector circuits, with each selector circuit having a switch through relay and including a plurality of tip, ring, sleeve and fourth supervisory terminals, an intercept trunk circuit directly connected to selected ones of the tip, ring, sleeve and fourth supervisory terminals to be intercepted including in combination, an intercept operator trunk line, intercept operator signal means, an intercept operator cord circuit, first means responsive to the positioning of the selector at selected selector terminals to be intercepted and the operation of said switch through relay for activating said signal means and connecting a busy signal to the selected sleeve terminals to be intercepted, said first means also being responsive to connect the selected tip and ring terminals of the selector to said intercept operator trunk line, second means responsive to the connection of said intercept operator's cord circuit with said trunk line to deactivate said signal means, said intercept operator cord circuit having a ring key, and third means responsive to the operation of said ring key during connection of the intercept operator trunk line with said selector circuit terminals to transmit a supervisory signal back through said selected fourth supervisory terminal of said selector circuit.

8. In an automatic telephone system of the type having a selector circuit including a plurality of tip, ring and supervisory signal terminals, an intercept trunk circuit having tip, ring and supervisory signal conductors connected directly to selected ones of the selector tip, ring and supervisory signal terminals to be intercepted including in combination, an intercept operator trunk line terminating in a multiple jack, an intercept operator cord circuit terminating in a multiple plug, intercept operator signal means, means responsive to the position of the selector under control of the calling line when establishing connection with the selected ones of the selector terminals to be intercepted for activating said signal means and for connecting the selected tip and ring terminals of the selector to the tip and ring conductors of the intercept operator trunk line, means operated in response to the connection of said plug with said jack by the intercept operator to deactivate said signal means, said cord circuit having a ring key, and means in said trunk circuit adapted to be energized in response to the operation of said ring key for connecting a supervisory signal to said supervisory signal conductor.

9. In an automatic telephone system of the type having a selector circuit including a plurality of tip, ring, sleeve and fourth supervisory signal terminals, an intercept trunk circuit having tip, ring, sleeve and fourth supervisory signal conductors connected directly to selected ones of the selector tip, ring, sleeve and fourth supervisory terminals to be intercepted including in combination, an intercept operator trunk line terminating in a multiple jack, an intercept operator cord circuit terminating in a multiple plug, intercept position signal means, first means responsive to the operation of the selector under control of the calling line when establishing connection with the selected ones of the selector terminals to be intercepted for activating said signal means and for connecting the selected tip and ring terminals of the selector to the tip and ring conductors of the intercept operator trunk line, said first means being also responsive to connect a busy signal to said sleeve conductor, second means operated in response to the connection of said plug with said jack by the intercept operator to deactivate said signal means, said cord circuit having a ring key, and third means in said trunk circuit adapted to be energized in response to the operation of said ring key for connecting a supervisory signal to said fourth supervisory signal conductor.

References Cited in the file of this patent

UNITED STATES PATENTS

| | | |
|---|---|---|
| 1,950,129 | Whitney | Mar. 6, 1934 |
| 2,021,286 | Butz | Nov. 19, 1935 |
| 2,105,898 | Whitney | Jan. 18, 1938 |
| 2,355,215 | Goddard | Aug. 8, 1944 |